Figure 1:
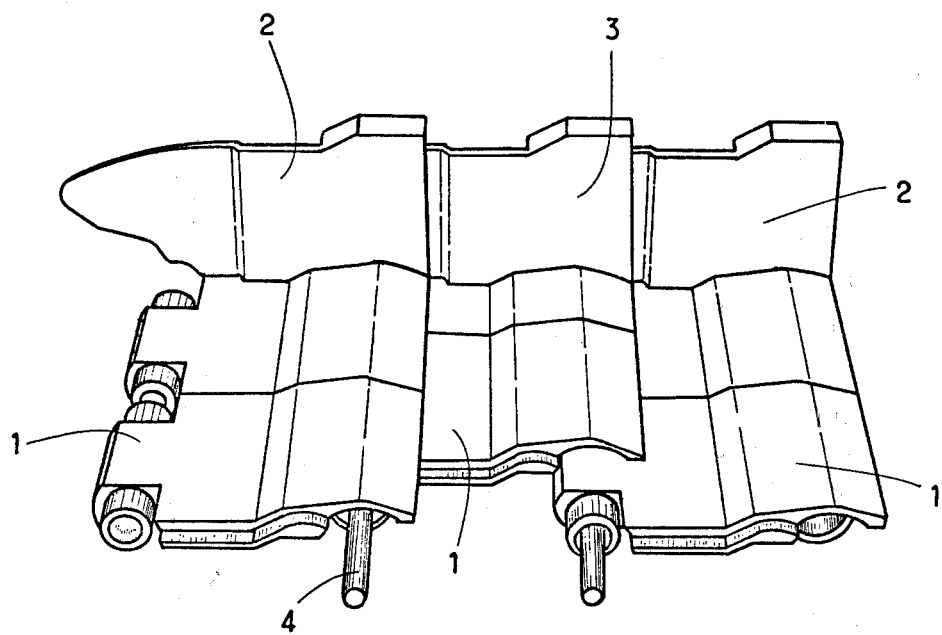

United States Patent [19]
Pinettes et al.

[11] 3,980,425
[45] Sept. 14, 1976

[54] FURNACE HEARTH

[75] Inventors: Jacques Pinettes, Gieres; Guy Hily, Albertville, both of France

[73] Assignees: Ugine Carbone, Grenoble; Ugine Aciers, Paris, both of France

[22] Filed: June 6, 1975

[21] Appl. No.: 584,383

[30] Foreign Application Priority Data
July 19, 1974 France .................. 74.25146

[52] U.S. Cl. .................. 432/239; 110/40 R; 432/235
[51] Int. Cl.² .................. F27D 3/00
[58] Field of Search ......... 432/235, 239; 34/236; 110/40 R

[56] References Cited
UNITED STATES PATENTS 2,028,479  1/1936  Spicer .................. 432/239
3,322,414  5/1967  Boron .................. 34/236

Primary Examiner—John J. Camby
Attorney, Agent, or Firm—Dennison, Dennison, Merserole & Pollack

[57] ABSTRACT

A furnace hearth for receiving and transporting small parts over the length of the furnace designed to prevent the parts from passing between the hearth links and especially at the furnace outlet where the links are detached from each other in passing over a driving boss. The hearth is formed by interlocking identical links and edge pieces having a horizontal portion and a vertical edge. A female pivot and a male pivot are provided on the links and edge pieces on opposite ends for interengagement.

8 Claims, 12 Drawing Figures

FURNACE HEARTH

The present invention relates to a furnace hearth, and in particular a furnace hearth adapted to receive parts of small dimensions and to transport them over the length of the furnace, without it being possible for these parts to pass between the links of the hearth either during their passage along the furnace or during their discharge at the outlet of the furnace where the links become detached from one another in order to roll around the driving boss.

Numerous known furnace hearths are composed of an arrangement of links, all of which are identical, and of edge pieces, the links and edge pieces being joined by pins or bars which pass through them and around which each row of links and edge pieces is adapted to pivot in relation to the preceding and following rows. A staggered arrangement of the links in relation to those of the neighbouring rows provides the advantage of enabling the links and edge pieces to be provided with male and female pivots by means of which they engage one another, thereby uncoupling the components of the forces supported by the hearth elements; the component parallel to the direction of advance is supported by these pivots and not by the pins, so that the deformation of the latter is substantially reduced.

This solution nevertheless makes it necessary to have two different edge elements alternating along each side of the hearth, a wider element being situated in each row opposite a narrower element; the width of the wide element is generally that of a link and that of the narrow element is then equal to half thereof.

The links of these known hearths are generally provided at each of their ends with a pivoting system, the elements of which are provided with an axial hole through which passes a connection pin or bar; at one end the inside diameter of the pivot (female pivot) is slightly greater than that of this pin and at the other end the inside diameter of the pivot (male pivot) is slightly greater than the outside diameter of the pivot at the first end.

The upper surface of the link forming part of the surface of the hearth after assembly is a plane surface parallel to the plane which passes through the geometrical axes of the pivots. At each end of the links this surface is extended by a curved surface which in a plane perpendicular to that of the axes of the pivots has a radius equal to that of the female pivot in this plane; the width of this curved surface is half that of the link in order to enable a link to engage with neighbouring links. The links can therefore be assembled in a staggered arrangement in relation to one another, the male pivot of each link engaging at each of its ends in an end of the female pivot of the preceding or following link. Each edge piece is also provided with a male and female pivots enabling it to engage with each of the pivots of the neighbouring link.

After assembly the surface of the upper run of the hearth has the form of a generally plane surface bordered by two vertical edgings, with the exception of a general sag between the support or driving points and the local voids or irregularities which it is necessary to leave between the links or edge pieces in order to enable the whole arrangement to operate correctly when hot.

It has been proposed that the lateral and vertical portions of the edge pieces should be given ribbed shapes, which in principle would permit a certain interlocking of these vertical portions, whose faces are not plane. It has also been proposed that the vertical plane portions of the edge pieces should be slightly inclined in relation to the longitudinal axis of the hearth, so that they are disposed like the slats of slatted shutter. Arrangements of this kind, however, do not prevent voids permitting the passage or engagement of small items from existing permanently or being formed on the pivoting of the elements on the end bosses, particularly taking into account the deformations which are inevitable during operation at high temperatures. In order to treat small pieces, such as nuts and bolts, it has been proposed that the hearth of a furnace should be composed of metal cloth associated with side edges; cloths of this kind however can withstand only low loads, and they wear out rapidly and need frequent delicate adjustments.

According to the present invention there is provided a furnace hearth formed by interlocking links, which are all identical to one another, and of edge pieces comprising a horizontal portion and a vertical edge, the links and edge pieces have at one end a female pivot and at the other end at least one male pivot, the male pivots of each dement engaging in an end of the female pivot of neighbouring elements; pins engaged inside the male pivots of the assembled elements; the plate of the links and edge pieces; having an upper surface which passes through a point tangent to the upper generatrix of the male pivots and, at a position parallel to the axis of the female pivots, through a point situated at a distance from the lastmentioned axis, which is equal to the outside radius of the female pivots, plus the thickness of the top plate, the plate extending forward of the axis of the female pivots by a portion whose bottom surface terminates in a plane parallel to the upper surface of the plate forward of the male pivots, the planes of the said bottom surface and of the said upper surface being spaced from a plane defined by the axes of the male and female pivots by a distance equal to the radius of the male pivots.

Like certain known hearths, the hearths of the invention are composed of links which are identical to one another and of edge pieces which for each of the walls are distinguished from one another only by the width of their horizontal portion. All these links and edge pieces are provided with a system of male and female pivots similar to that of certain known hearths which have just been described.

Referring briefly to the drawings these show the system of pivots wich permits the interengagement of the links and edge pieces and the pivoting of one row in relation to the neighbouring rows when they wind round the end bosses. The female pivots 11 have an outside diameter D and an inside diameter $d$, these pivots extending over about half the width of a link and the rear pivots 5, which in the central portion of the link correspond to the width of the pivots 11, have an outside diameter $D_1$ and an inside diameter $d_1$ and, in the portions of the links outside this central portion, an outside diameter $D_1$ slightly smaller than $d$ and an inside diameter $d_1$ slightly greater than that of the pins which will pass through the arrangement after assembly.

Nevertheless, the hearths of the invention are distinguished from these known hearths by a number of arrangements which, taking into account the clearances necessary for the operation of the hearth in the cold and hot states, enable them to receive objects as small as balls of a diamter of 2 mm; their elements may be produced direct by a precision foundry process such as the shell moulding process with a single core of small size. These arrangements ensure very good lateral tightness and very good tightness at front and rear both along the horizontal portions of the hearth and during the pivoting of the links and edge pieces around the end bosses.

The most important of these arrangements can be summarised as follows:

a. for the links and the horizontal portions of the edge pieces the following characteristics:

1. the upper surface of the plate passes through a line $a$ tangent to the radius $D_1/2$ of the rear pivots 5 and through a line $b$ parallel to the axis of the front pivot 11 and situated at a distance from the axis of the latter equal to the radius $D/2$ plus the thickness of the upper plate;

2. the plate projects forwards from the line $b$ in the form of an extension 18 the lower surface 181 of which is parallel to the portion of the upper surface near the line $a$ and which, on assembly, is situated practically-allowing for slight clearance — in contact with the corresponding surface of the preceding element (link or edge piece);

3. in its region near the front pivot 11 the bottom surface of the plate is situated at a distance close to half the diameter $d$ in relation to the reference plane P passing through the axes of the pivots, in order to enable the teeth of the end bosses to penetrate deeply under the plate during the winding onto the end bosses;

4. a tongue whose upper surface is below the upper surface of the link extends along the central portion of one side of each link and the other side of the link is hollowed in order to receive the tongue of the adjacent link on assembly; the horizontal portions of the edge pieces are provided either with a tongue or with a hollow enabling them to be joined together either on one side or on the other side of a link.

b. the vertical side parts of the edge pieces comprise two front and rear portions having faces parallel to a plane perpendicular to the axes of the pivots connected by an oblique portion, the front lateral portion of each edge piece being provided on its outer face with a recess in which the rear lateral portion of the preceding edge piece slides after assembly.

Figure 2:
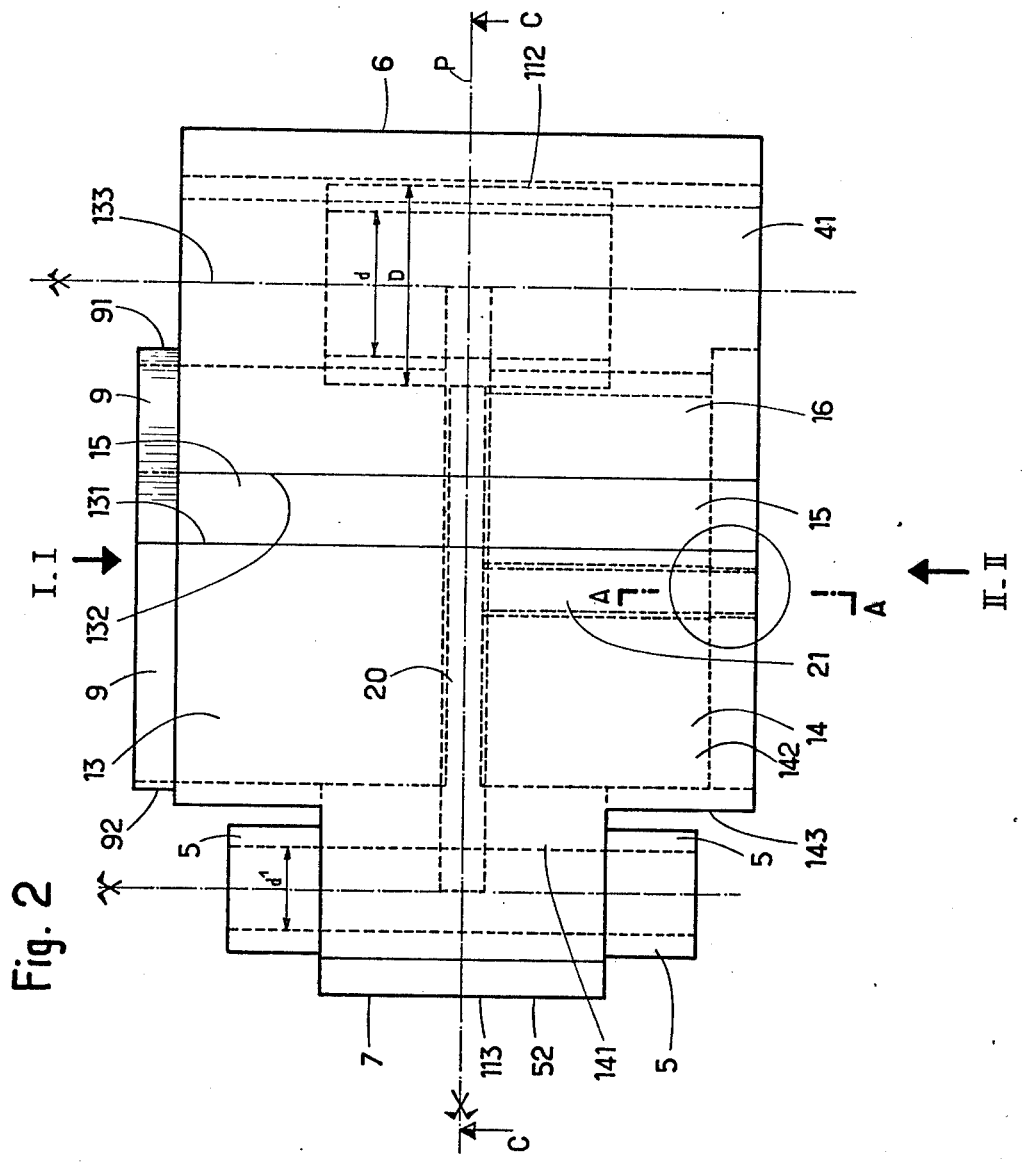
Figure 3:
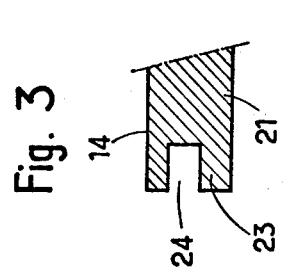
Figure 4:
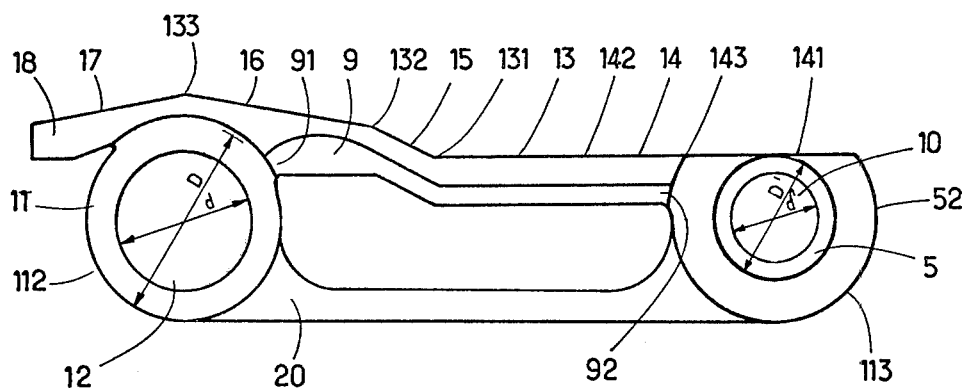
Figure 5:
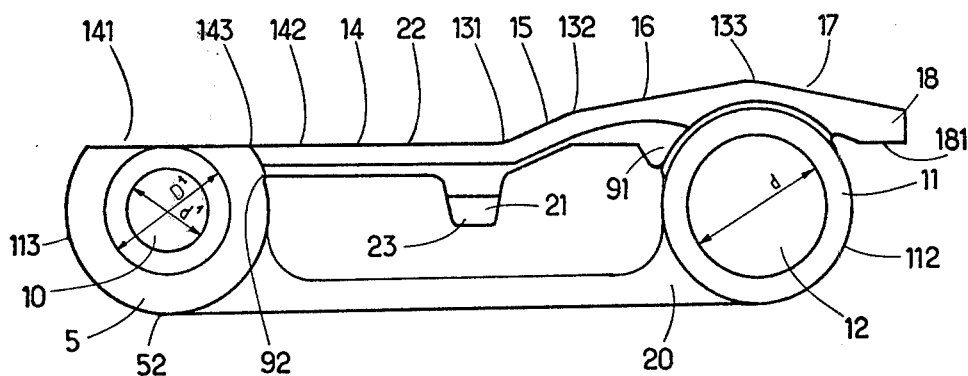

The invention will now be further described with reference to the accompanying drawings in which:

FIG. 1 is a partial general view of a hearth according to the invention, showing the interlocking of the links and edge pieces, FIG. 2 shows a link viewed from above, FIG. 3 is a section of a detail on the line A—A in FIG. 2, FIG. 4 is a side view of a link on the lin I—I in FIG. 2, FIG. 5 is a side view of a link on the line II—II in FIG. 2

Figure 6:
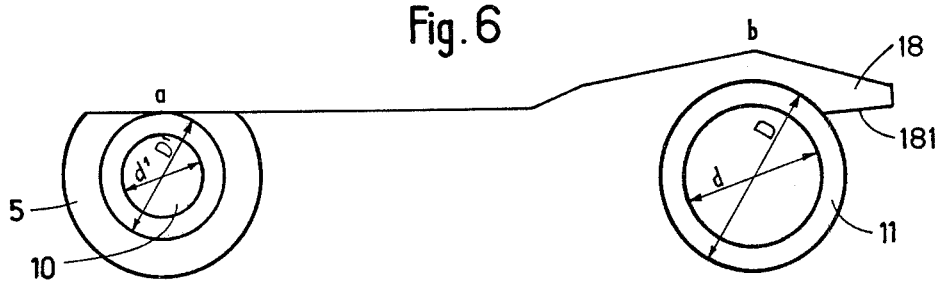
Figure 7:
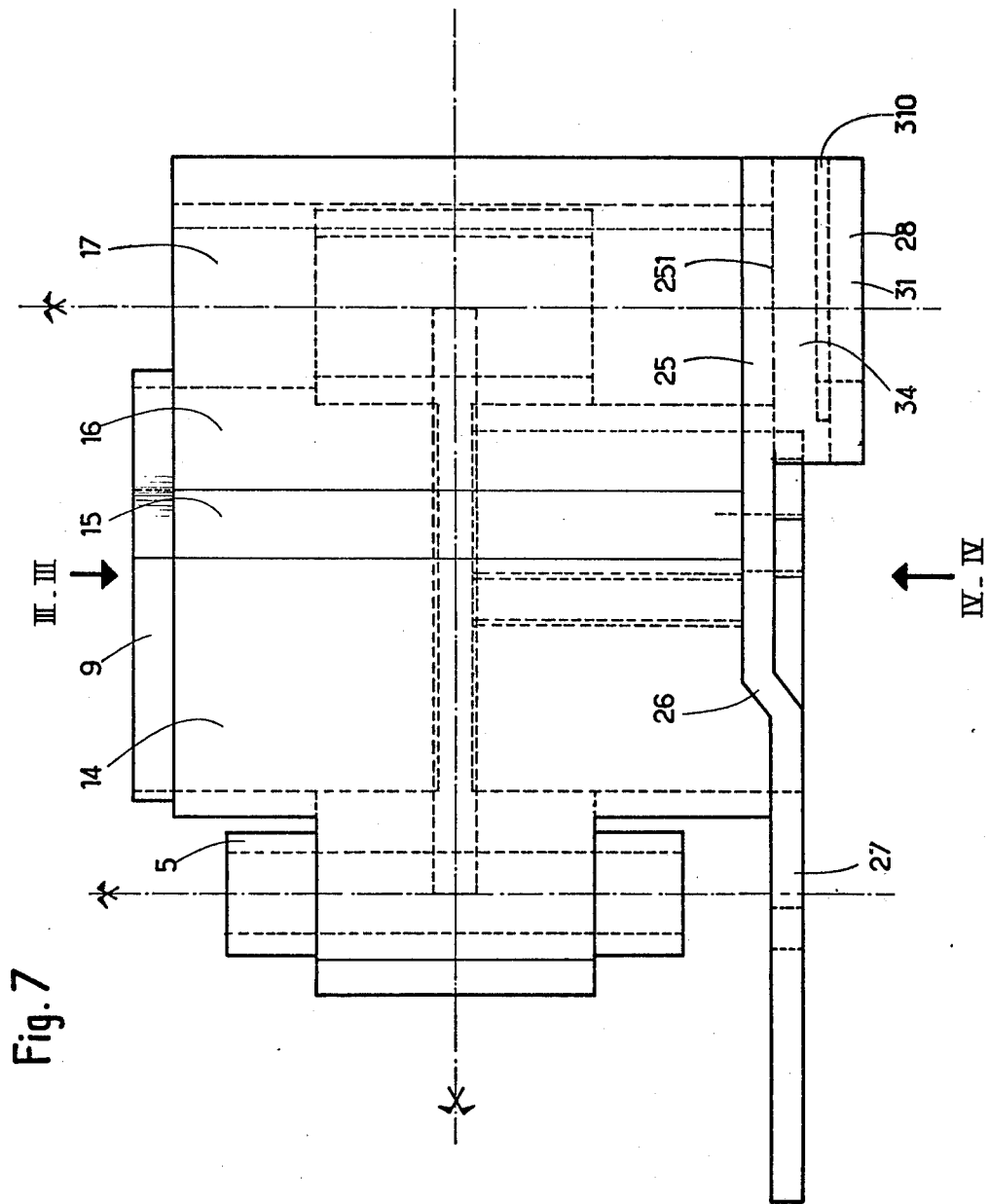
Figure 8:
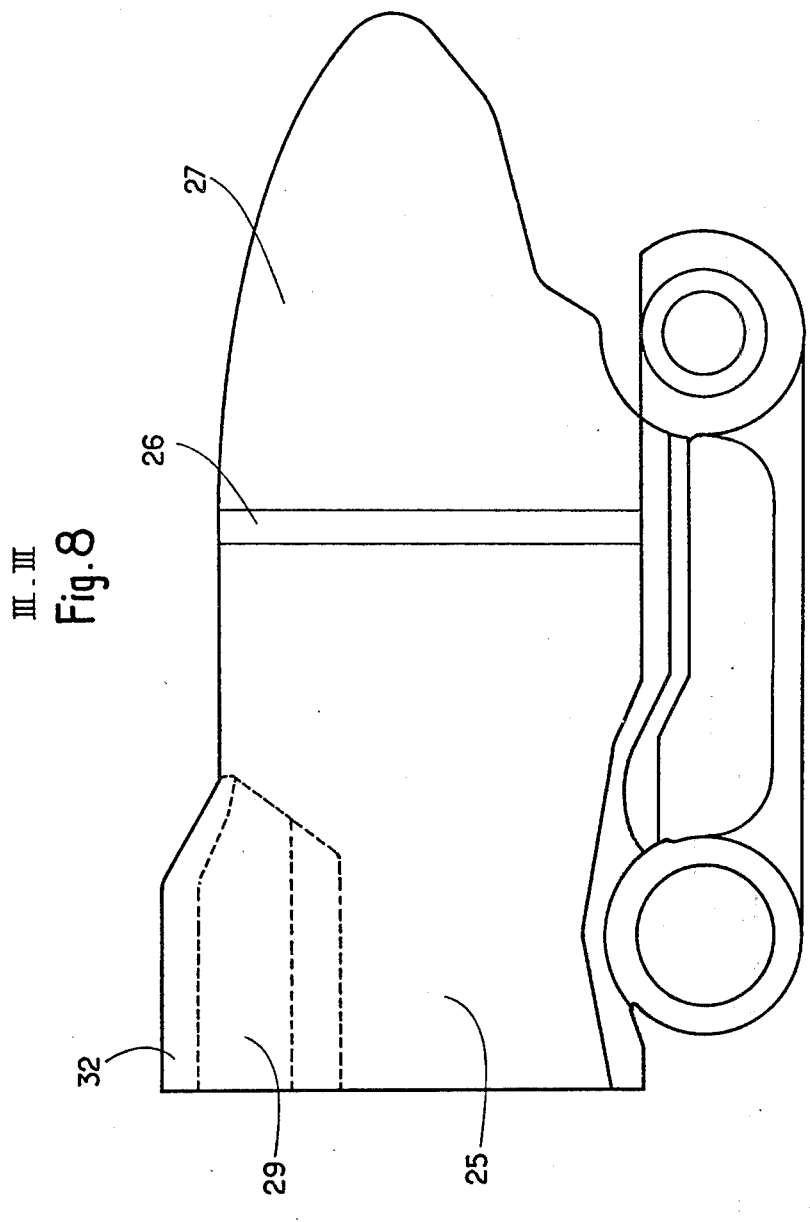
Figure 9:
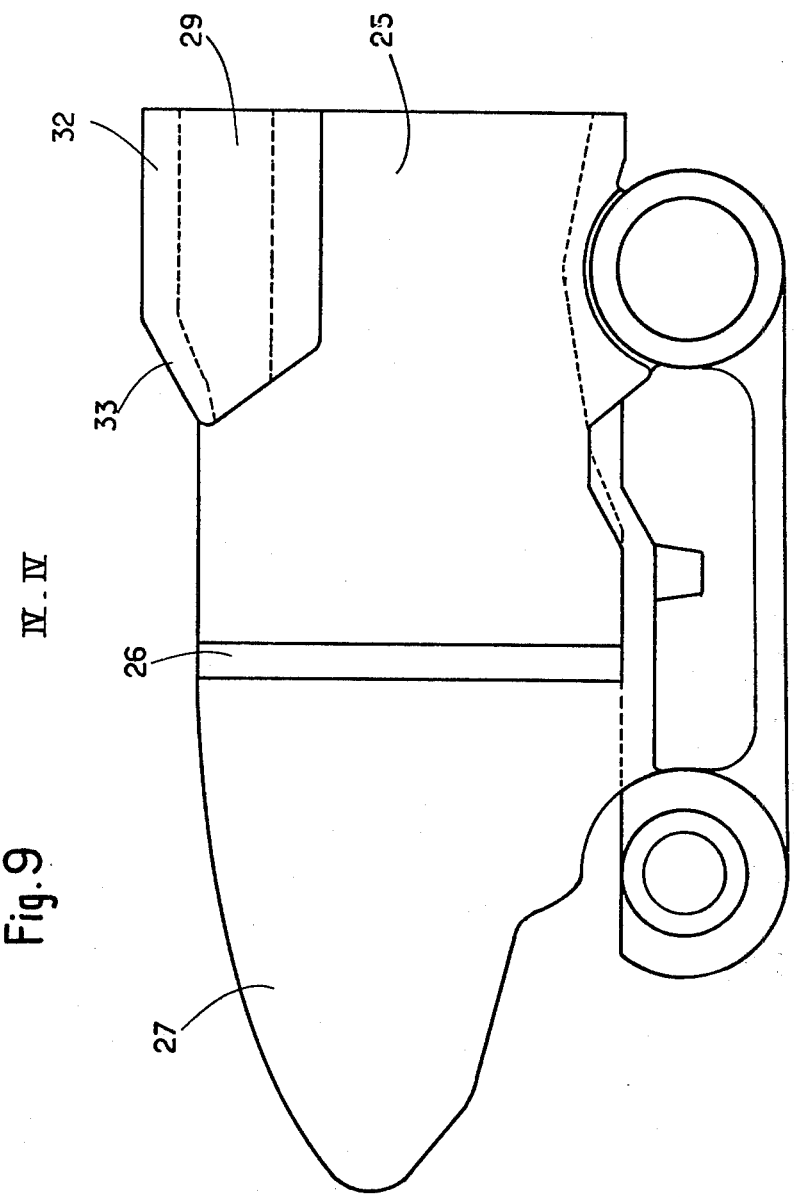
Figure 10:
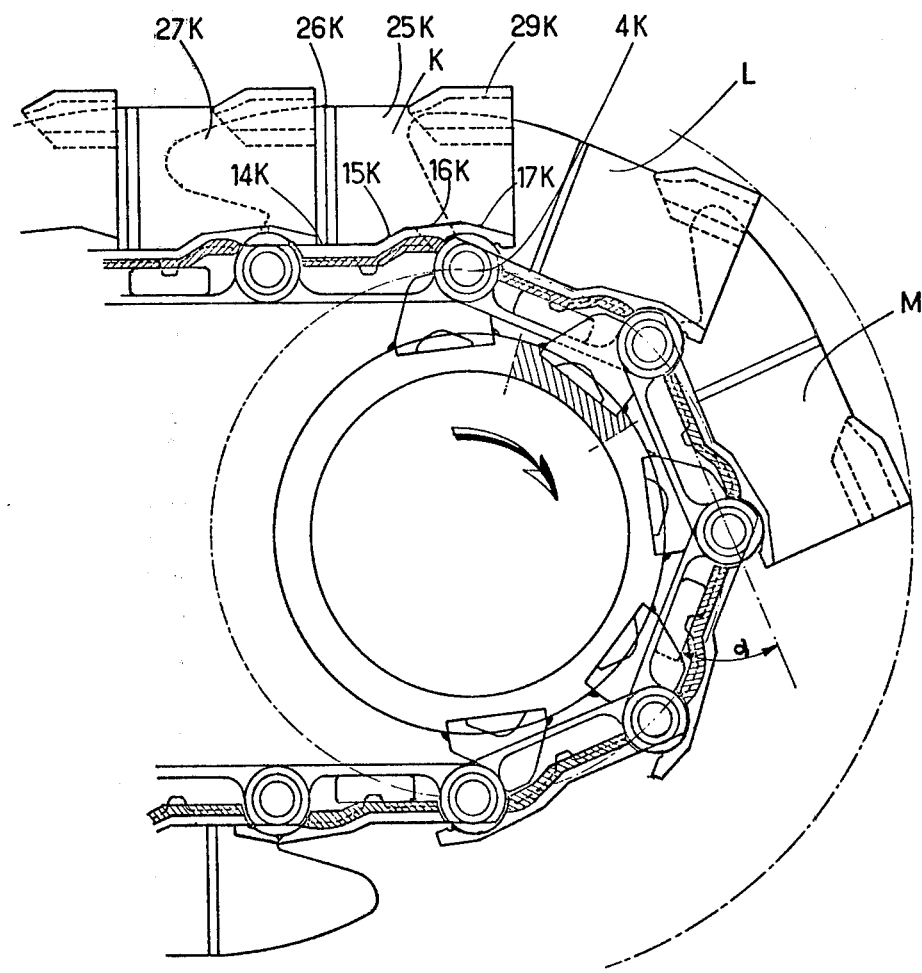
Figure 11:
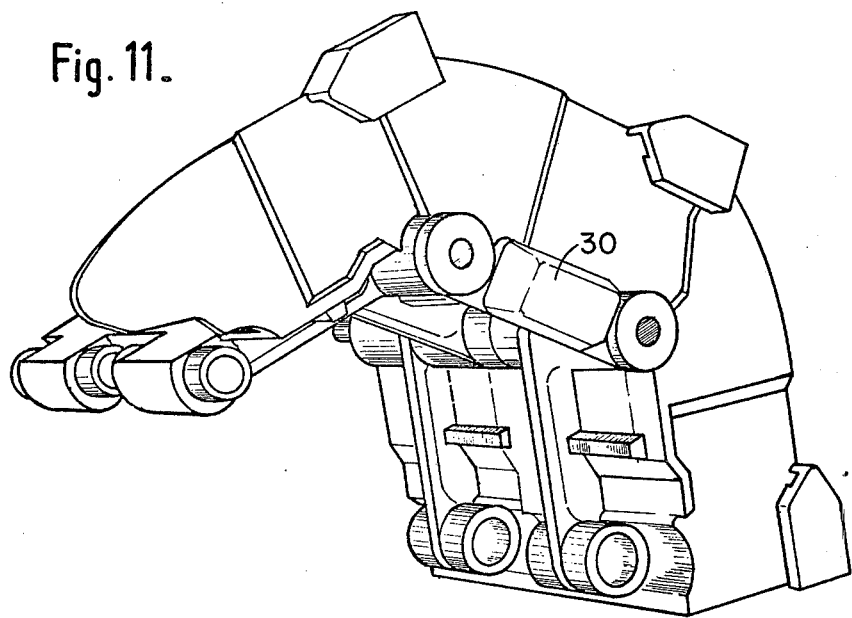
Figure 12:
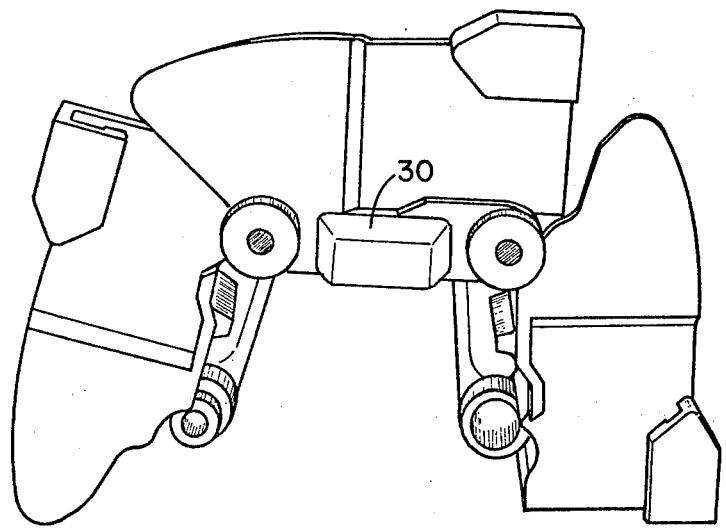

FIG. 6 is a diagrammatical longitudinal section of a link, showing a top link surface tangent at $a$ to the cylindrical surface of radius $D_1/2$ of the rear pivot 5 and passing through a line $b$ parallel to the axis of the front pivot 11 and situated at a distance from the latter equal to the radius $D/2$ of the said pivot plus the thickness of the top plate, FIG. 7 shows an edge piece viewed from above, FIG. 8 is a side view of an edge piece on the line III—III in FIG. 7, FIG. 9 is a side view of an edge piece on the line IV—IV in FIG. 7, FIGS. 10 and 11 are partial side views of a hearth according to the invention when the rows are pivoting about an end boss, and FIG. 12 is a side view of the hearth during the placing in position of the last edge piece.

In the hearth illustrated herein, the elements have a special upper surface corresponding to the point a mentioned above and, at the level of the rear pivot, have a line tangent to a cylinder of a radius slightly greater than $D_1/2$ and at the level of the front pivot have a line tagent to a cylinder whose radius R is close to $D/2$ plus the thickness of the plate.

In FIGS. 2 to 5 and 7 to 12, the upper surfaces of the horizontal portions of the elements are of particular shape.

Referring to FIG. 1, links 1, all of which are identical, two edge pieces 2 of greater width, and one edge piece 3 of smaller width are shown.

The horizontal portion of the edge pieces 2 has the same width as the links; the width of the horizontal portion of the edge pieces 3 is half that of the length 1. The pins or bars 4 which enable the links and edge pieces to be joined together and about which they pivot are also shown.

FIGS. 2 to 4 show in greater detail a link of a hearth according to the invention. In their general shape these links are symmetrical in relation to a plane P the path of which is shown in FIG. 2 and which is perpendicular to the axes of their pivots and passes through the middle of the front side 6 and rear side 7 of the link. The rear male pivots 5 and the front female pivots 11, are symmetrical in relation to the plane P. On one of the sides of the link is a tongue 9 the purpose of which will be seen later on in the description.

The aperture 10 of the male pivots has a diameter $d_1$ slightly larger than that of the bars joining the hearth together. The female pivot 11 has an aperture 12 whose inside diameter $d$ is slightly greater than the outside diameter $D_1$ of the male pivots 5 so that the latter can engage therein. The outside contour 52 of the male pivot in the portion of the link bracket 113 near the planes P and R, below the upper surface of the link in that zone, is the same as that of the corresponding portion 112 of the female pivot, so that after engagement of the end portions of the male pivot in a female pivot the outer contours of these parts are in line with one another. The axes of the pivots 5 and 11 define a reference plane R (not shown).

In the particular embodiment illustrated the upper surface 13 of the link is composed of four surface portions which in order to facilitate the description will provisionally be connsidered to be plane. These portions intersect on parallel lines 131, 132, 133, and they may be connected together by curved surfaces. The first plane surface starting from the rear end of the link, which surface carries the male pivots 5 and is given the reference numeral 14, is parallel to the plane R which passes through the front and rear axes of the pivots; its distance from that plane is equal to the radius of the outer portions of the male pivots, so that it is tangent to the upper generatrix of the outer portions; it comprises two parts of unequal widths: the rear portion 141 has a width equal to half that of the front portion 142; they join one another at the level of the rear edge 143 of the portion 142 whose distance from the axis of the pivots 5 is slightly greater than the radius D/2 of the pivots 11; the rear face of the link containing the rear edge 143 of the portion 142 is a cylindrical surface having a radius slightly greater than that of the pivots 11 along which it will move in the course of the pivoting of the links in relation to one another, without this pivoting producing a void between the parts moving relative to one another. The portion of surface 142 is extended towards the front of the link approximately as far as half the distance separating axis of the pivots 5 from the axis of the pivots 11. The surface 14 is followed by a plane surface 15 forming with 14 a very open angle. The surface 15 is followed by a third plane surface 16 the slope of which is less accentuated than that of the surface 15. This surface 16 is extended as far as the line $b$. Finally, the upper surface of the link ends in a plane surface 17 slightly sloping in the opposite direction to the previously mentioned surfaces. This surface 17 is that of an extension 18 of the carrying portion of the link well forward of the pivot 11. The front lower plane 181 of this extension 18 is parallel to the plane of the surface 141, these two planes being situated at a distance $D_1/2$ from a plane R defined by the axes of the pivots. When the links are assembled, the extension 18 covers the surface 141 and partly covers the surface 142 of the preceding link, preventing any items from passing between the links of consecutive rows. Finally, in FIGS. 2, 4, and 5 can be seen a longitudinal stiffener 20, which corresponds to a conventional arrangement already employed in the construction of known links.

The links of a hearth according to the present invention are provided on one side with a tongue 9 of slight width (for example 5 to 10 mm); its thickness is about half that of the plate; its bottom surface extends the surface of the plate near to it, accompanying the latter from the point where the surface of the plate encounters the outer surface of a pivot 11 to the point where it encounters the outer surface of a pivot 5 in the central portion of the link; the front end 91 and rear end 92 of this tongue are arcs of a circle, so that they follow the external curvature of the pivots when the elements are joined together. When the links are engaged with one another, the tongue 9 is engaged under the edges of the zones 14, 15, 16 of the neighbouring element, which edges have been reduced in thickness for that purpose over a width corresponding to that of the tongue 9. In the event of a void being accidentally formed between two links, this tongue would ensure the tightness of the hearth; during the pivoting of the links in relation to one another, its ends ensure tightness along the outer surfaces of the pivots. There can also be seen a transversal reinforcement 21 the end 23 of which leaves a void 24 between it and the bottom surface of the link plate. This end terminates simultaneously with this plate, and the void 24 has the same dimensions in respect of thickness and width as the tongue 9 engaged in it on assembly, obviously allowing for the clearances necessary for this assembly. Nevertheless, the transversal reinforcement 21 is not obligatory. FIG. 2 shows another optional arrangement of the links according to the invention; the foot of the stiffener 20 is widened beyond the width necessary to ensure the rigidity of the link; the object of this arrangement is to provide firmer support for the hearth on rollers or rails disposed in various positions under a hearth of great length when loaded.

The bottom surface of the plate may be of any nature subject to what has been said in respect of the surface 18, and provided that in the extension of the female pivots 11 it is composed of a cylinder of a radius slightly greater than that of the said pivots 11 or of the central portion of the pivots 5.

The edge pieces shown in FIGS. 7 to 9 have a horizontal portion which comprises the same elements as the links. Nevertheless, the edge pieces intended for one of the sides of the hearth have a side tongue 9, while the edge pieces intended for the other side of the hearth have been reduced in thickness in order to receive the tongue 9 of the neighbouring link; these last-mentioned edge pieces may, like the first-mentioned, have a transversal reinforcement 21, but in that case it is unnecessary to provide therein a void 24. The width of the successive edge pieces along each side of the hearth differs by half the width of a link; thus, if the larger pieces have the same width as a link, the width of the hearth will be a multiple of the half-width of a link.

In FIGS. 7 to 9 it is possible to see the pivots 5, the plane zones 14, 15, 16, 17 and the tongue 9. The edge of the side wall of the edge pieces can be seen. These side walls are identical in all the side pieces. It can be seen that they are composed of three successive zones. The first zone 25 at the front of the edge piece forms the largest portion of the inside lateral wall of the hearth; it has any desired height. It is extended along the surfaces 17, 16, 15, 14 without reaching, along the last-mentioned surface, the point to which the surface 17 of the following element extends after assembly. In the direction of the rear of the edge piece, the zone 25 is followed by an oblique zone 26, and then by another zone 27 parallel to the zone 25. The inside surface of the zone 27 is in the same plane as the outside surface of the zone 25, allowing for the clearance necessary to enable the corresponding surfaces of two successive pieces to slide in relation to one another after assembly. The length of the oblique portion 26 between the portions 25 and 27 is deduced from this requirement of the hearth during its operation. The upper face of an element 28 can be seen, whose shape and purpose will be indicated later on.

FIGS. 8 and 9 make it possible to understand more easily the shape of the side walls of the edge pieces and their interlocking. On each piece there are found once again the successive zones 25, 26, 27 of their side wall. The zones 25 and 26 are joined to the horizontal portion of the piece over their entire length, and the zone 27 is joined thereto over a small part of its length starting from the zone 26; the rear portion of the zone 27 has a shape formed of curved lines the shape of which will be better understood when the operation and the mounting of the hearth according to the invention have been explained. It is clear that when the horizontal face of an edge piece forms part of the horizontal plane of the hearth, there is no substantial gap between the outer face of the portion 25 of a piece and the inner face of the portion 27 of the edge piece preceding it; in this relative position the rear end of the portion 27 of an edge piece is engaged in the element 29 (which will be described later on) adjacent to the zone 25 of the following edge piece. The upper contour of the zone 27 of an edge piece must be such that when it pivots about an end boss it is displaced freely inside the element 29 of the following edge pieces, while being held therein until the said pivoting has reached a degree where the disengagement of the said zone 27 from the said element 29 is effected progressively starting from the end of the said zone 27. The bottom contour of the zone 27 of an edge piece must be such that during the pivoting of this piece, no void is formed between the latter and the following edge piece in the side wall of the hearth, and such that the bottom portion of this zone 27 does not prevent the placing in position of the last edge piece during the assembly of the hearth. FIG. 11 also shows a boss 30 which may optionally be provided at the base of the edge pieces in order to guide the hearth at intervals, to prevent the pins 4 from catching against the walls of the furnace, and to re-centre the hearth at the height of the toothed end bosses. The thickness of this boss 30 is at least equal to the length by which the pins extend beyond the outer wall of the hearth.

The wall of the zone 25 is slightly raised over the length of the element 29 bounded by a parallel wall 31 connected to the preceding wall by a horizontal portion 32; the front of the element 29 and that of the wall 31 are at the level of the front of the zone 25, and the horizontal portion 32 may be extended by an inclined portion 33 to the higher general level of the side wall 25. The bottom portion of 31 may be reinforced by a boss 310. The space 34 between the walls 25 and 31 forms a recess in which the zone 27 of the preceding edge piece is engaged and guided.

The assembly of the entire hearth according to the invention presents no particular difficulties. It is sufficient to start with edge pieces which do not have a tongue 9 and to engage the elements one after the other until the desired width and length are obtained. Only the placing in position of the last edge piece on each wall requires special precautions, which will be better understood when the operation of the furnace according to the invention has been explained.

FIGS. 10 and 11 are respectively a side view and a view from underneath, showing the relative position of the successive rows of links and edge pieces when these rows roll round the edge bosses. Side views can be seen of a number of successive rows K, L, M, and in each of these rows the side walls of the edge pieces with their three successive portions, such as 25K, 26K, 27K, and their elements 29, such as 29K. The trace of the supporting surface of each row can also be seen, together with the successive surfaces in each link, such as 14K, 15K, 16K, 17K, the traces of the pins such as 4K, that of the outer surface of the pivots 5 and that of the outer surface of the pivots 11. When two successive rows are situated on the top run of the hearth, the front faces of the side walls of the edge pieces are parallel and vertical; the voids between the elements constituting the hearth are individually limited to the clearances which have to be provided because of the manner in which the parts are produced and because of expansion during operation. In the cold state each of the clearances necessary may be as little as 0.5 mm; a hearth is therefore obtained which has particularly good tightness and in which the clearances during operation do not permit the passage of an object of which each dimension is as small as 2 mm.

When a row starts to become inclined, starting from the horizontal run, in order to roll over an end boss whose teeth grip the outer rear surfaces of the pivots 11, its outer surface becomes detached and moves away from the bottom surface 181 of the following row, but tightness is ensured because of the slight clearance between the rear portions of the surface 14 facing the pivots 11 of the following elements, or facing the bottom surface of the zone 17 the curvature of which has been designed for this purpose. The rear zone of the two side walls is in turn displaced in the recesses 34 in the walls of the following elements, which is permitted by the upper contour of these zones. However, the bottom contour of these zones has been so designed that no void will be produced between the side walls, at least until the surface which is becoming increasingly inclined as it rolls around the boss is freed of the objects which it carried. Consequently along the walls it is not possitble for any void to be produced which would permit the passage of items of dimensions greater than the clearance necessary for operation, that is to say items having a dimension greater than 2mm.

It should be noted that all the edge pieces have identical side walls with the exception of the boss 30, which may be provided only on some of them. It has been possible to see that the total length of a side wall is much greater than the distance separating the front of the side wall of an edge piece of rank $n$ from the rear of the wall of the piece of rank $n + 2$; consequently, it appears that it is not possible to engage the last edge piece which has to be engaged in the element 29 of the following piece and which must receive in its element 29 the front of the wall of the piece preceding it. It could also be thought that the hearth of the invention cannot be dismantled because it is impossible to remove a first edge piece. However, a special piece is in no way required and it is sufficient to dispose the rows surrounding the last row to be assembled, in such a manner that the plane R of the latter forms with each of the planes R of its two neighbours an angle close to 90°. In such a position the bottom front end of the last end piece does not strike against the rear bottom end of the piece preceding it, and the rear end of this last-mentioned piece does not strike against the wall 31 of the element 29 of the piece following it. The last edge piece can therefore be placed in position and removed easily. When a hearth according to the invention is insatlled it is then necessary for at least one of the end bosses to be provided with slides permitting displacement of a link, by a length at least equal to the distance between axes, from the operating position.

It has been indicated that all the elements of a hearth according to the invention can be produced by a casting process.

For the horizontal portions it is preferred to use two-part moulds in which the junction plane for the links is theplane P for each of them. It is sufficient to provide the tapers necessary for the planes or straight lines perpendicular to this plane.

It should be noted that the adoption of these tapers does not entail additional clearance, since the overlaps are so designed as to compensate for them.

The shape given to the plate and to the trace of its bottom surface is compatible with deep, progressive engagement of the teeth of the end bosses on the arrival of the pivots 11 during the pivoting of the elements about these bosses. This deep engagement makes it possible to use bosses having a small radius and having eight teeth. For example, with a distance between the axes of the front and rear pivots of 100 mm, it is possible to use bosses having eight teeth which permit a theoretical rolling diameter of the pivot axes of 260 mm.

What we claim is:

1. A furnace hearth formed by elements including interlocking links, which are all identical to one another, and edge pieces, each comprising a horizontal portion and a vertical edge, each link and edge piece horizontal portion including a plate having at one end a female pivot and at the other end at least one male pivot, the male pivots of each element engaging within an end of the female pivot of neighboring elements; pins engaged inside the male pivots of the assembled elements; the plate of each link and edge piece having an upper surface which passes through a point tangent to the upper generatrix of the associated male pivots and, at a position parallel to the axis of the associated female pivot, through a point situated at a distance from the lastmentioned axis which is equal to the outside radius of the female pivot plus the thickness of the plate, the plate extending foward of the axis of the female pivot in a portion having a bottom surface in a plane parallel to the upper surface of the plate forward of the male pivots, the planes of the said bottom surface and of the said upper surface being spaced from a plane defined by the axes of the male and female pivots by a distance equal to the radius of the male pivots.

2. A furnace hearth according to claim 1, wherein the plates of the links are provided along one side with a tongue below the upper surface, and on the other side are reduced in thickness to form a recess for the tongue of the neighboring link, the edge pieces having their plates provided with a tongue or being reduced in thickness.

3. A furnace hearth according to claim 2, in which the portions of the plates which are reduced in thickness are provided with a transverse stiffener whose end leaves a void receiving the tongue of the neighboring link or edge piece.

4. A furnace hearth according to claim 3 which is provided with a longitudinal axis stiffener whose foot is preferably widened.

5. A furnace hearth according to claim 1, in which the vertical edges of the edge pieces have vertical surfaces, each said vertical edge being composed of three portions, one at the front having its faces parallel to the axial longitudinal plane of the hearth, the third at the rear likewise being parallel to that plane, while the outer face of the first is, allowing for the necessary clearance, in the same plane as the inner face of the third, and the second portion being connected obliquely to the other two, the first portion being provided at the top of its front part with a recess engaging the third portion of the preceding element, the contour of the third portion being in its upper part a curved line such that during the pivoting of an edge piece about a driving boss the rear part of the said edge piece reamins engaged by its top part in the recess of the following piece, and such that during this pivoting there is no gap between two successive pieces, the contour of the said third portion in its bottom part being such that it is possible for the last edge piece to be placed in position.

6. A furnace hearth according to claim 5, in which at the bottom of the side of a part of the edge pieces there are provided guide bosses the thickness of which is at least equal to the length by which the pins extend beyond the edge pieces.

7. A furnace hearth according to claim 2, in which the vertical edges of the edge pieces have vertical surfaces, each said vertical edge being composed of three portions, one at the front having its faces parallel to the axial longitudinal plane of the hearth, the third at the rear likewise being parallel to that plane, while the outer face of the first is, allowing for the necessary clearance, in the same plane as the inner face of the third, and the second portion being connected obliquely to the other two, the first portion being provided at the top of its front part with a recess engaging the third portion of the preceding element, the contour of the third portion being in its upper part a curved line such that during the pivoting of an edge piece about a driving boss the rear part of the said edge piece remains engaged by its top part in the recess of the following piece, and such that during this pivoting there is no gap between two successive pieces, the contour of the said third portion in its bottom part being such that it is possible for the last edge piece to be placed in position.

8. A furnace hearth according to claim 1 in which the plate, rearward of the female pivot, is spaced from the plane defined by the axes of the male and female pivots by a distance approximately half the diameter of the male pivot.

* * * * *